(12) United States Patent
McKay (10) Patent No.: US 11,530,116 B2
(45) Date of Patent: Dec. 20, 2022

(54) SEESAW HOOK APPARATUS

(71) Applicant: Nelson O. McKay, Santa Ana, CA (US)

(72) Inventor: Nelson O. McKay, Santa Ana, CA (US)

( * ) Notice: Subject to any disclaimer, the term of this patent is extended or adjusted under 35 U.S.C. 154(b) by 105 days.

(21) Appl. No.: 17/087,774

(22) Filed: Nov. 3, 2020

(65) Prior Publication Data
US 2021/0047149 A1  Feb. 18, 2021

(51) Int. Cl.
*B66C 1/36* (2006.01)
*B64D 1/22* (2006.01)
*B64C 27/04* (2006.01)

(52) U.S. Cl.
CPC ............... *B66C 1/36* (2013.01); *B64D 1/22* (2013.01); *B64C 27/04* (2013.01)

(58) Field of Classification Search
CPC .... B66C 1/10; B66C 1/14; B66C 1/36; B66C 13/06; B64D 1/22
USPC ................. 294/67.1, 67.5, 81.1, 81.3, 81.56
See application file for complete search history.

(56) References Cited

U.S. PATENT DOCUMENTS

| | | | |
|---|---|---|---|
| 532,321 A * | 1/1895 | Gates | |
| 2,346,277 A * | 4/1944 | Sherman | B66C 1/00 294/82.1 |
| 2,721,757 A * | 10/1955 | Anderson | B66C 1/125 294/81.2 |
| 3,838,836 A * | 10/1974 | Asseo | G05D 1/0858 244/137.4 |
| 5,143,326 A * | 9/1992 | Parks | B64D 1/22 294/81.1 |
| 5,593,113 A * | 1/1997 | Cox | B66C 1/34 294/82.26 |
| 5,927,649 A * | 7/1999 | Nykiforuk | B64D 1/22 294/82.26 |
| 6,357,810 B1 * | 3/2002 | Schwulst | B66C 1/125 294/67.5 |
| 9,371,213 B1 * | 6/2016 | Bernat | F16G 15/08 |
| 2020/0031632 A1* | 1/2020 | Hanahara | B66C 1/34 |

FOREIGN PATENT DOCUMENTS

CN  111606189  *  9/2020

* cited by examiner

*Primary Examiner* — Dean J Kramer
(74) *Attorney, Agent, or Firm* — Cionca IP Law P.C.; Marin Cionca (57) ABSTRACT

An apparatus for use by a load-lifting machine in aerial lift and transportation of loads, the apparatus comprising: a triangular body having a first side and a second side, the triangular body being adapted to balance weights of the loads simultaneously aerially lifted and transported; a plurality of holes, each hole of the plurality of holes being disposed in a corner of the triangular body; a plurality of couplers, each coupler of the plurality of couplers being connected to one of the plurality of holes; a lifting hook comprising a self-locking latch and an eye loop, the lifting hook being connected to a first coupler of the plurality of couplers via the eye loop, and the lifting hook being adapted to attach to the loads; and a lifting ring connected to a second coupler of the plurality of couplers, the lifting ring being adapted to connect to the load-lifting machine.

19 Claims, 5 Drawing Sheets

SEESAW HOOK APPARATUS

BACKGROUND OF INVENTION

1. Field of the Invention

The invention relates generally to hooks and mechanisms for lifting loads, and more specifically to a seesaw hook apparatus having a triangular plate for balancing a weight of objects and people aerially lifted and transported.

2. Description of the Related Art

Currently, hooks are used for a multitude of purposes in aerial lifting, such as in emergency extraction, search and rescue, construction, and other trades and fields involving the aerial lifting of loads (e.g., objects and people). Traditional hooks, however, are not as resourceful as they can only transport one load at a time; each load must be picked up and dropped off one by one, increasing the amount of traveling time and related costs involved. Many hooks also lack a self-locking mechanism, increasing the amount of time necessary for attaching said hooks to particular loads. Moreover, traditional hooks possess the risk of accidentally latching onto other objects, which may cause accidents to occur during transportation. Additionally, depending on the type of load being transported, the hook used may have to be changed each time the type of load changes (i.e., object to person). Such changing of hooks adds to the transport times and increases any associated labor costs.

Furthermore, traditional hooks lack the design and configuration necessary to function in multiple settings and environments. Many traditional hooks are specialized and tailored for use in lifting a particular load in a particular environment (e.g., warehouse, the outdoors, airport). As such, there exists a lack of a universal hook that can not only support more than one load at a time, but also support more than one type of load at a time.

Therefore, there is a need to solve the problems described above by providing a universal, multipurpose seesaw hook apparatus and method of use for the safe and efficient aerial lifting and transportation of loads.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a seesaw hook apparatus is provided for use by a load-lifting machine in aerial lift and transportation of at least one load. The seesaw hook apparatus may comprise: a triangular body having a first side, a second side, and a base, the triangular body being adapted to balance weights of two loads simultaneously aerially lifted and transported; the first side having a first length and the second side having a second length, the first length being larger than the second length; a plurality of holes, each hole of the plurality of holes being disposed in a corner of the triangular body; a plurality of couplers, each coupler of the plurality of couplers being connected to one of the plurality of holes; at least one lifting hook comprising a self-locking latch and an eye loop, the at least one lifting hook being connected to a first coupler of the plurality of couplers via the eye loop, and the at least one lifting hook being adapted to attach to the at least one load when the self-locking latch is released; and at least one ring connected to a second coupler of the plurality of couplers, the at least one ring being adapted to connect to the load-lifting machine; the at least one lifting hook and the at least one ring being thus adapted such that when the at least one load is attached to the at least one lifting hook, and when the load-lifting machine causes a motion of the seesaw hook apparatus, the triangular body stabilizes the motion, and thus resulting in the aerial lift and transportation of the at least one load. Thus, an advantage is that the seesaw hook may lift and transport multiple loads at any given time, which may reduce overall traveling time due to the reduced number of load transportation trips. Another advantage is that the seesaw hook may accommodate multiple types of loads and rigging hardware during aerial lift and transportation, reducing the load loading, and unloading times. An additional advantage is the reduction in operational costs, since the seesaw hook may negate the need for purchasing multiple types of traditional hooks designed for lifting and transporting a single type of load. Such advantages may thus also contribute to an increase in the overall workflow efficiency in the given environment and field that the seesaw hook is employed, as another advantage.

In another aspect, a seesaw hook apparatus is provided for use by a load-lifting machine in aerial lift and transportation of loads. The seesaw hook apparatus may comprise: a triangular body adapted to balance weights of the loads simultaneously aerially lifted and transported, the triangular body having a first side and a second side; a plurality of holes, each hole of the plurality of holes being disposed in a corner of the triangular body; and a plurality of hooks, each hook of the plurality of hooks being connected to one of the plurality of holes, and each hook being adapted to attach to at least a portion of the loads; wherein at least one hook of the plurality of hooks is also adapted to connect to the load-lifting machine; the plurality of hooks being thus adapted such that when the loads are attached to the plurality of hooks, and when the load-lifting machine causes a motion of the seesaw hook apparatus, the triangular body balances the weights of the loads such that to stabilize the motion, and thus resulting in the aerial lift and transportation of the loads. Thus, an advantage is that the seesaw hook may evenly balance the loads attached to the seesaw body, allowing for the stable lift and transport of multiple types of loads having varying weights and sizes at any given time. Thus, another advantage is the reduction in overall loading, unloading and travel times when lifting and transporting multiple loads at a time. Another advantage is the ability to transport loads through areas and environments having narrow passages or other obstacles.

In another aspect, a seesaw hook apparatus is provided for use by a load-lifting machine in aerial lift and transportation of loads. The seesaw hook apparatus may comprise: a triangular solid body having a first side, a second side, and a base, the triangular solid body being adapted to balance weights of the loads simultaneously aerially lifted and transported; the first side having a first length and the second side having a second length, the first length being larger than the second length; a plurality of holes, each hole of the plurality of holes being disposed in a corner of the triangular solid body; wherein each hole of the plurality of holes is adapted to receive a hook configured for aerially lifting and transporting the loads. Thus, an advantage is that the seesaw hook may evenly balance the loads attached to the seesaw body, allowing for the stable lift and transport of multiple types of loads having varying weights and sizes at any given time. Thus, another advantage is the reduction in overall loading, unloading and travel times when lifting and transporting multiple loads at a time. Another advantage is the ability to transport loads through areas and environments having narrow passages or other obstacles.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 110 and 210, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1:
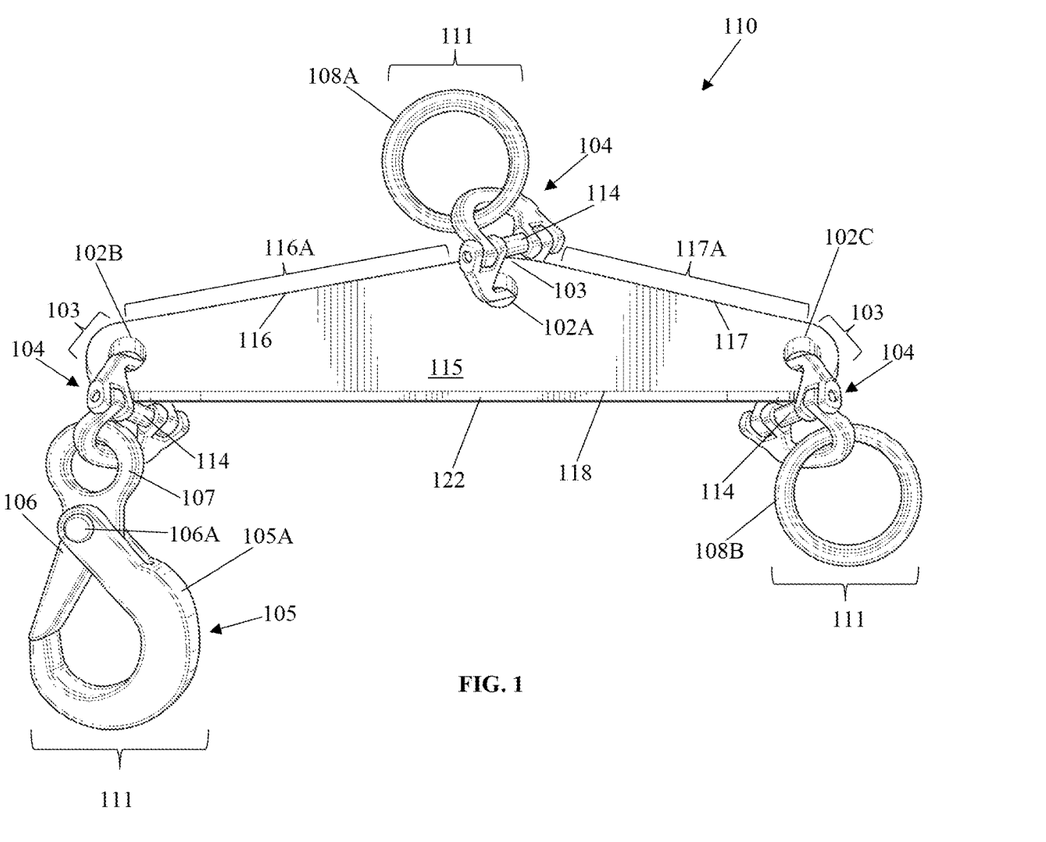
FIG. 1 illustrates a front perspective view of a seesaw hook, according to an aspect.

FIG. 1 illustrates a front perspective view of a seesaw hook 110, according to an aspect. As shown in FIG. 1, the seesaw hook ("seesaw hook," "seesaw hook apparatus," "apparatus") 110 may comprise a solid seesaw body ("seesaw body," "triangular body," "seesaw hook body") 115 having a generally triangular shape, wherein each corner 103 of the triangular seesaw body 115 is rounded, as an example. As shown, the solid seesaw body 110 may comprise a first side 116, a second side 117, and a base 118 connecting the first side 116 and the second side 117, such that the solid body 115 is triangular, as mentioned above. As an example, the first side 116 may comprise a first length 116A and the second side 117 may comprise a second length 117A, wherein the first length 116A is larger than the second length 117A, as shown. It should be understood that the seesaw body 115 may be alternatively configured such that the second length 117A is larger than the first length 116A, as needed. As shown, each corner 103 of the seesaw body 115 may be provided with a hole (e.g., 102B), such that the seesaw hook 110 comprises three holes 102A-102C, for example. It should be understood that the seesaw hook 110 may be provided with a smaller or larger number of holes disposed in the seesaw body, as needed. As shown in FIG. 1, the seesaw hook 110 may be provided with a plurality of hooking mechanisms ("hooking mechanisms," "hooks") 111, such that each hole 102A-102C of the seesaw body 115 is fastened with one of the plurality of hooking mechanisms 111. As will be described in detail throughout this disclosure below, the hooking mechanisms 111 may enable the aerial lifting and transportation of multiple types of loads.

As mentioned above, the seesaw hook 110 may comprise a plurality of hooking mechanisms 111 (three in this case) connected to the plurality of holes 102A-102C, as shown. As shown in FIG. 1, each hooking mechanism of the plurality of hooking mechanisms 111 may comprise a coupler ("coupler," "coupling link") 104 and a lifting hook ("lifting hook," "eye hook") 105 or lifting ring ("lifting ring," "round ring," "ring") 108A, 108B, as an example. As shown, the coupler 104 may fasten/couple the lifting hook 105 or ring 108A, 108B to one of the plurality of holes 102A-102C in the seesaw body 115, as an example. As an example, the coupler 104 may comprise a center pin 114, as shown, on which the coupler 104 may pivot, such that the orientation of the lifting hook 105 or lifting ring 108A, 108B may freely adjust as needed during lifting and transportation of a load. As shown as an example in FIG. 1, the seesaw hook 110 may preferably be provided with one lifting hook 105 and two lifting rings 108A, 108B. However, it should be understood that other combinations (e.g., two lifting hooks and one ring) may alternatively be provided. Additionally, as shown as an example, the eye hook 105 may be provided on the side 116 in the bottom left hole 102B of the seesaw body 115 in the view shown in FIG. 1. As an example, the lifting hook 105 may be connected on the longer side 116 such that the lifting hook 105 may be easier for a user to grab to hook to a load, due to a downward tilt in the seesaw body 115 along the side 116, as will be discussed in greater detail later. It should be understood that the lifting hook may alternatively be fastened to the bottom right hole 102C of the seesaw body 115, for example, as needed. It should also be understood that alternative fastening means may be provided in place of the coupler 104, such as, for example, metal links or clips, shackles, and carabiners.

As shown in FIG. 1, the lifting hook 105 may comprise a curved hook body 105A and a safety latch 106 having a manually operated trigger element (not shown), for example, that causes the safety latch 106 to unlock when the trigger element (not shown) is operated by a user. The unlocking of the trigger element (not shown) may allow a user to open the safety latch 106 outwardly affixed to a bolt 106A and separate from the hook body 105A, such that a load may then be easily attached onto the eye hook body 105A and the safety latch 106 closed and locked in place for aerial lift and transportation. The lifting hook 105 may thus be self-locking, preventing the attached load from accidentally slipping off the hook body 105A during lifting, and/or preventing the hook body 105A from accidentally snagging an exterior object (e.g., an electrical power line or branch) during transportation, as an example. Thus, an advantage is that the lifting hook may be self-locking, contributing to the safety and security of the seesaw hook in lifting applications. It should be understood that the safety latch 106 is preferably caused to unlatch and open away from the hook body 105A, as mentioned above, as opposed to being caused to contract toward the hook body 105A. Such a configuration may further prevent the lifting hook 105 from snagging onto power lines or other objects during transportation because the latch 106 is prevented from being caused to contract. While a self-locking safety mechanism is shown in FIG. 1, the lifting hook may be provided with alternative types of safety mechanisms, such as a sling or a grip latch, for example, but such alternative safety mechanisms should still preferably open away from the hook body 105A during loading. As shown, the lifting hook may also comprise an eye ring ("eye ring," "eye") 107 for connecting the lifting hook body 105A to the coupler 104, as an example.

As mentioned previously above, the seesaw hook 110 may be provided with hooking mechanisms 111 having round rings 108A, 108B, as shown in FIG. 1. It should be noted that the topmost hole 102A, depending on the orientation of the seesaw body 115 during use, of the seesaw hook 110 should be provided with a hooking mechanism 111 having the lifting ring 108A. As an example, the lifting ring 108A may be connected to a chain made of strong metal like steel, for example, wire rope, a nylon sling, fiber, or any other suitable hoisting/lifting medium or hardware. The chosen lifting medium may also connect to an external load-lifting machine, such as a crane, jack, or a helicopter, for example, for causing the lifting and transportation of the load(s) connected to the seesaw hook 110, as an example. As an example, the lifting ring (e.g., the bottom right round ring) 108B may also be used to lift and transport a load. As such, the load may be provided with straps or other sling types for securing the load onto the lifting ring 108B (see e.g., FIG. 3). The seesaw hook 110 may be provided with both the lifting hook 105 and the lifting ring 108B to accommodate various types of loads and rigging hardware (e.g., clips, shackles, turnbuckles, swivels, etc.), as an example. Thus, a user operating a particular load-lifting machine (e.g., a crane) need not change the equipped hooking mechanism 111 for the lifting of a load having particular rigging hardware, such that the seesaw hook 110 may be a universal, multipurpose hook. The seesaw hook 110 shown in FIG. 1 may thus be adapted to lift and transport multiple loads at a time, each load being attached to one of the hooking mechanisms 111.

Thus, an advantage is that the seesaw hook may lift and transport multiple loads at any given time, which may reduce overall traveling time due to the reduced number of load transportation trips. Another advantage is that the seesaw hook may accommodate multiple types of loads and rigging hardware during aerial lift and transportation, reducing the load loading, and unloading times. An additional advantage is the reduction in operational costs, since the seesaw hook may negate the need for purchasing multiple types of traditional hooks designed for lifting and transporting a single type of load. Such advantages may thus also contribute to an increase in the overall workflow efficiency in the given environment and field that the seesaw hook is employed, as another advantage. It should be understood that, as an example, more than one lifting ring (e.g., 108B) may be provided on a single coupler 104 for attaching multiple smaller loads, for example, on the same side of the seesaw hook 110.

As mentioned above, the seesaw hook 110 may lift and transport more than one load at any given time. In addition, the seesaw hook 110 may lift and transport more than one size of load at any given time. As an example, let the seesaw hook 110 be adapted into a load-lifting machine operating in a warehouse. In such an environment, the seesaw hook 110 may be provided with two loads of differing size and therefore weight, with each load being attached to a respective hooking mechanism 111. As the load-lifting machine lifts the loads attached to the seesaw hook 110, each load may pull on each side 116, 117 of the seesaw body 115 with a downward force of a certain magnitude corresponding to the weight of the load, as an example. Due to the triangular shape of the seesaw body 115, as well as the differing lengths of the sides 116, 117, and because the holes 102B, 102C are disposed at the opposite corners 103 of the seesaw body 115, the seesaw hook 110 may orient itself such that to evenly distribute the overall weight of the loads throughout the seesaw body 115, such that movement of the loads is stabilized, as an example. As is known, triangles and therefore triangular structures, such as the seesaw body 115, are rigid, such that their interior angles are fixed. As such, the triangular seesaw hook 110 will balance the loads attached on both sides of the seesaw body 115, allowing the loads to be effectively and securely lifted and transported. If the seesaw body 115 was configured to be unable to balance the weight of the load(s) attached to the seesaw hook 110, as an example, any resultant movement of the load(s) by a load-lifting machine would be unstable, causing the load(s) to uncontrollably sway and/or shake, which could damage the load(s).

Thus, an advantage is that the seesaw hook may evenly balance the loads attached to the seesaw body, allowing for the stable lift and transport of multiple types of loads having varying weights and sizes at any given time. Thus, another advantage is the reduction in overall loading, unloading and travel times when lifting and transporting multiple loads at a time. It should be understood that the seesaw body 115 may tilt (like a seesaw, for example) its body to evenly distribute the weight of one or more loads attached at either side of the seesaw hook 110.

As shown in FIG. 1, the seesaw body 115 may further comprise a thickness 122, as an example. The thickness 122 may be uniformly provided throughout the seesaw body 115, such that the seesaw body 115 comprises a single thickness. As an example, the seesaw body thickness 122 may contribute to the seesaw hook's ability to safely and securely lift and transport loads. The thickness 122 may provide strength and durability, such that the seesaw body 115 does not bend, break, or otherwise falter during load lift and transportation, which could damage the load(s) if the load(s) were to resultantly fall and/or collide with external objects. The thickness 122 may also help the seesaw body 115 to balance and evenly distribute the overall weight exerted on the seesaw body 115 when multiple loads are attached to the seesaw hook 110, as an example. The thickness 122 may be varied (i.e., increased or decreased) as needed, such that to better accommodate loads of increased or decreased weight, as an example. Thus, an advantage is the safe, durable, and reliable lift and transportation of multiple loads, which may thus reduce or negate any damages incurred by the bending or breaking of the seesaw body.

As an example, the lifting hook 105 of the seesaw hook 110 may be provided in two distinct sizes (not shown): a first smaller size and a second larger size. The lifting hook 105 may be provided as such to accommodate loads of varying sizes and therefore weights. As an example, the first smaller lifting hook 105 may be adapted to lift and support loads up to a maximum of 2,500 pounds. The second larger lifting hook 105 may be adapted to lift and support loads up to a maximum of 7,100 pounds, as an example. Thus, depending on the size and weight of the loads to be lifted and transported, the seesaw hook apparatus 110 may be provided with a lifting hook 105 having the first smaller size or the second larger size for sufficiently and securely lifting and transporting said loads. It should be understood that the lifting hook may comprise the same exemplary components described above (e.g., the self-locking latch 106) for either size variation.

As shown in FIG. 1, the seesaw hook 110 may be thus configured such that the seesaw body 115 is horizontally oriented when the seesaw hook 110 is attached to a load-lifting machine during use, as an example. As such, the seesaw hook 110 may be attached to the load-lifting machine via the lifting ring shown at 108A, as similarly mentioned above. In certain situations, and/or environments, it may be necessary or desirable to lift and transport load(s) through a narrow passage (e.g., through a narrow aisle in a warehouse or in between two neighboring trees). In such cases, lifting and transporting the load(s) with the seesaw body 115 horizontally oriented (as shown in FIG. 1) may be risky, subjecting the load(s) to damage if any collisions or snags occur. To address such scenarios, the seesaw hook 110 may be thus configured such that the seesaw body 115 is vertically oriented when the seesaw hook 110 is attached to the load-lifting machine. As such, the seesaw hook 110 may be attached to the load-lifting machine via the bottom lifting ring 108B, such that the lifting ring at 108B becomes the top-most lifting ring, as an example. Thus, because a width of the seesaw body 115 in its vertical orientation is significantly reduced, as compared with a width of the body 115 in its shown horizontal orientation, during transportation, the load(s) attached to the seesaw hook 110 may be positioned significantly closer together when the load(s) are lifted and transported. Thus, the load(s) attached to the seesaw hook 110 having a vertical orientation may more easily and safely traverse narrow passages during transportation, as an example. Thus, an advantage is an increase in maneuverability and functionality of the seesaw hook during use due to the adaptability and versatility of the seesaw body's orientation. Another advantage is the ability to transport loads through areas and environments having narrow passages or other obstacles.

As an example, the seesaw hook 110, and its exemplary components (e.g., lifting hook 105 and rings 108A, 108B) may be constructed of a durable, heavy duty material such as carbon steel, or alloy steel, for example. The hooking mechanisms 111 and/or the seesaw body 115, as an example, may be made from other durable materials like wrought iron. The seesaw hook 110 may thus be configured to be heavy duty such that to support loads of various weights, as an example.

Figure 2:
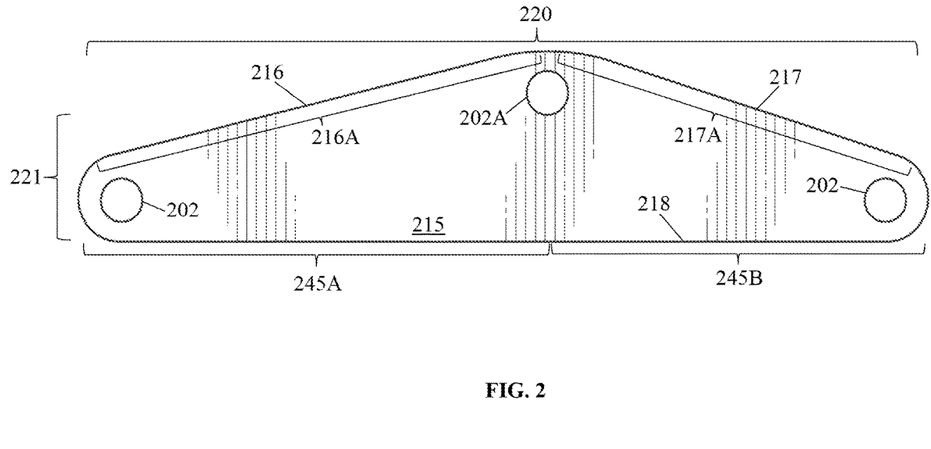
FIG. 2 illustrates a front elevation view of the seesaw hook body shown in FIG. 1, according to an aspect.

FIG. 2 illustrates a front elevation view of the seesaw hook body 115 shown in FIG. 1, according to an aspect. As described previously throughout this disclosure above, the seesaw hook (shown in FIG. 1, for example) may comprise a seesaw body 215 having a triangular shape, a plurality of holes 202, and a thickness (not shown). The seesaw hook described herein above may advantageously facilitate the aerial lift and transportation of multiple loads at any given time, the loads varying in type, size, and weight. As will be discussed herein below, the seesaw body 215 of the seesaw hook may be thus configured such that to accommodate loads of different sizes aerially lifted and transported in particular environments.

As shown in FIG. 2, the exemplary seesaw body 215 may be configured to have a given length 220 and a given height 221, as an example. It should be understood that the seesaw body may be provided with any length 220 and any height 221 suitable for balancing the weight of the load(s) attached on either side 216, 217 of the body 215, as will be described in more detail below. Regardless of the length 220 or the height 221 that the seesaw body 215 is provided with, it should be understood that one side (e.g., 216) will always be longer than the other side (e.g., 217), as shown as an example. Due to the triangular shape of the seesaw body 215, it should also be understood that the base 218 of the seesaw body 215 will always be the longest of the three sides of the triangular seesaw body 215.

As mentioned above, the seesaw body size may be thus configured such that to accommodate loads of different sizes in particular environments. As an example, in an industrial setting (e.g., a warehouse), the seesaw hook may be provided in a load-lifting machine for lifting and transporting loads being boxes, cargo, packages, etc. having relatively medium to lower weights (e.g., less than or about 100 pounds (lbs)). As such, it may be preferable to provide a seesaw body 215 having a larger size (e.g., longer length 220 and taller height 221) to better balance and support the load(s) attached to the seesaw hook. As another example, in a construction setting, the seesaw hook may be provided in a load-lifting machine (e.g., a crane) for lifting and transporting loads being heavy materials having relatively high weights (e.g., over 1,000 lbs.). As such, it may be preferable to select a seesaw body 215 having a smaller size (e.g., smaller length 220 and shorter height 221) to better balance and support the much heavier loads. As an example, having a smaller body length 220 may position the loads attached at the ends of the seesaw body 215 closer together, and thus enable the seesaw body 215 to better balance the load weight without exceeding a load limit (e.g., 7,100 lbs.).

As mentioned above, the triangular body 215 may comprise a plurality of holes 202, with each hole being disposed in a corner of the seesaw body 215, as shown. As also stated above, the seesaw body 215 may comprise an exemplary height 221 and length 220. As an example, it may be desired to aerially lift and transport loads that are large and/or bulky using the disclosed seesaw hook apparatus. As such, it may be preferable to thus provide a seesaw body 215 having a larger size such that the plurality of holes 202 are horizontally sufficiently spaced apart, and thus such that the bulky loads may be spaced farther apart when connected to the seesaw hook. Thus, when the bulky loads are being transported, they are less likely to collide with each other and/or snag onto each other, which would potentially damage the loads, as would be more likely if the bulky loads were positioned closer together, for example. As described above, the seesaw body 215 may be vertically oriented when connected to a load-lifting machine. As an example, it may be desired to aerially lift large and/or bulky loads through a narrow passageway, and thus the vertical orientation would be employed. In order to prevent such loads from colliding and/or snagging in this configuration, it may be desirable to again select a larger seesaw body 215, such that the bulky loads are vertically staggered and sufficiently horizontally spaced apart when connected to the seesaw hook apparatus. Thus, the single seesaw body 215 may accommodate bulky loads when used in both the horizontal and vertical orientations, such that the resultant seesaw hook apparatus is multifunctional.

As described previously above when referring to FIG. 1, the seesaw body 215 may comprise a thickness (not shown) for providing the seesaw hook with increased strength and durability. As an example, a seesaw hook equipped in a construction setting, as mentioned above, may preferably have a seesaw body comprising a larger thickness. As shown as an example, let the seesaw body 215 be divided into two smaller triangles/portions spatially defined by the top hole 202A. As such, let the first triangle be represented by the portion 245A and the second triangle by 245B, as shown in FIG. 2. As an example, given that the first length 216A is longer than the second length 217A, the first triangle 245A may comprise a larger portion of the seesaw body 215, and may thus comprise a larger portion of the weight of the seesaw body 215. Correspondingly, the second triangle 245B may thus comprise a smaller portion of the seesaw body 215, as shown, and may thus comprise a smaller portion of the weight of the seesaw body 215. As will be described in greater detail below, such a weight discrepancy within the seesaw body 215 helps create a weight differentiation when lifting and transporting loads.

Figure 3:
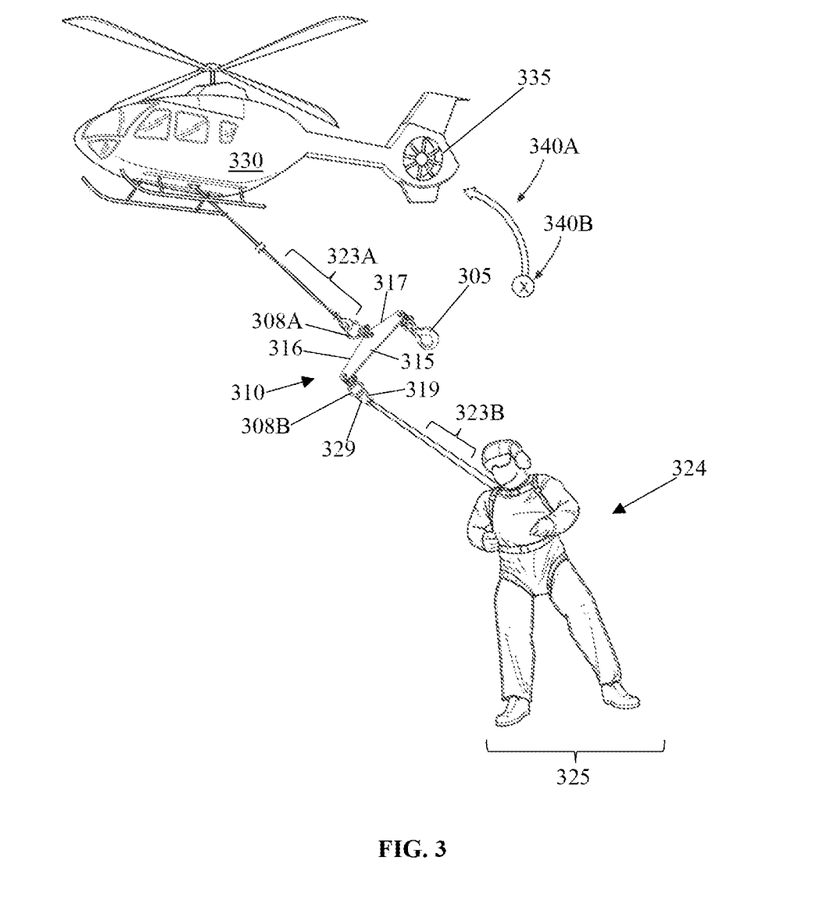
FIG. 3 illustrates a perspective view of an exemplary use of the seesaw hook 110, shown in FIG. 1, attached to a helicopter in flight, according to an aspect.

FIG. 3 illustrates a perspective view of an exemplary use of the seesaw hook 110, shown in FIG. 1, attached to a helicopter 330 in flight, according to an aspect. As described previously above, the seesaw hook 310 may be adapted to be retrofitted into existing load-lifting systems for the safe, effective, and secure aerial lift and transportation of loads. As such, the seesaw hook 310 may be multipurpose and be configured for use in a plurality of fields and for a variety of uses. Additionally, the loads may be of varying types, sizes, and weights, such as various objects and builds of people. As shown in FIG. 3, the seesaw hook 310 may be attached to a helicopter 330 and may carry a user 324 as part of an aerial search and rescue mission, for example.

As shown in FIG. 3 as an example, the seesaw hook 310 may be thus adapted such that the seesaw body is oriented horizontally, such that the top lifting ring 308A is attached to top exemplary rigging hardware (e.g., a hook and line) 323A. The top exemplary rigging hardware 323A may be attached to the helicopter 330, as shown, which in this example functions as the load-lifting machine. Per the example, a load 325 being lifted and transported by the seesaw hook 310 may be a human user 324. As shown as an example, the bottom lifting ring 308B may be connected to a self-locking D-ring (e.g., a carabiner) 319 having a threaded sleeve 329 for quickly connecting the D-ring 319 to the bottom ring 308B. The threaded sleeve 329 may be gripped and pulled such that the D-ring 319 may be unlocked and opened, for example, such that the load 325 connected to a sling and harness 323B may be quickly attached to the round ring 308B. The threaded sleeve 329 may then be disengaged such that the threaded sleeve 329 may close to lock. Thus, the D-ring 119 may be configured such that to prevent the attached load from accidentally slipping off the bottom lifting ring 308B during lifting and/or prevent the accidental snagging of an exterior object (e.g., an electrical power line or branch) during transportation, as an example.

As described above, the bottom round ring 308B is used to lift the load 325, the round ring 308B being connected to the first side 316 of the seesaw body 315 in this example, as shown. As mentioned previously when referring to FIG. 1, the first side 316 may be longer than the second side 317, as shown. As shown as an example, the bottom ring 308B may be attached to the load 325 via the D-ring 319 and exemplary rigging hardware (e.g., the sling and harness) 323B, as mentioned above.

As described above, the seesaw hook 310 may be adapted for use with the helicopter 330 for lifting and transporting people (the load 325) during an aerial search and rescue (SAR) mission. During use, as an example, the seesaw hook 310 may be attached to the helicopter 330, such that the top lifting ring 308A is connected to the top rigging hardware 323A, having a hook and line/cable, which is connected to the helicopter 330. The seesaw hook 310 may also be attached to the user 324, who may be an SAR hoist operator or EMT for example, via the bottom rigging hardware 323B, having the D-ring 319 and line attached to the harness worn by the first user 324, as shown as an example. It should be understood in this example that the weight of the user 324 constitutes a weight of the overall load 325. During the SAR mission, the helicopter 330 may travel to a particular destination (e.g., hilltop, forest) in search of a second user (shown in FIG. 4, for example), who may be stranded, isolated, or otherwise incapacitated and in need of help. As shown, the seesaw hook body 315 may be tilted slightly downward in the direction of the load 325 during transportation. In this way, the seesaw body 315 is balancing the overall weight of the load 325, such that the user 324 may be safely transported to the rescue sight, as an example.

As mentioned above, the user 324 may be attached to the seesaw hook 310 and transported via the helicopter 330 such that to rescue a second stranded user. As such, maintaining the safety of the user 324 is imperative during the initial travel to the rescue destination. As mentioned above when referring to FIG. 1, the first side 316 may comprise a first length (e.g., 116A) that is larger than a second length (e.g., 117A) of the second side 317, as shown in FIG. 3. The first side 316 may be configured in this way such that the weight of a first portion (e.g., 245A in FIG. 2) of the seesaw body 315 may always be larger than the weight of a second portion (e.g., 245B) of the seesaw body 315, as described previously when referring to FIG. 2. As such, as the load 325 (i.e., the user 324) is being transported through the air by the helicopter 330, the seesaw body 315 is tilted such that to therefore travel at an angle, as shown. In this way, the seesaw body 315 is prevented, indicated by 340B, from gliding (as an airplane) and lifting upwardly, as indicated by 340A. Should the seesaw body 315 be configured with the sides 316, 317 having equal lengths, the seesaw hook 310 would be subject to gliding and rising, which would cause the attached load(s) 325 to also lift upwardly and rise, potentially leading to a collision between the user 324 or the seesaw hook 310 and the helicopter rotor 335. Such a collision would damage the load, the helicopter, and/or the seesaw hook, and in the case wherein the load is a human, could potentially kill the human. Thus, an advantage of the unequal triangular shape of the seesaw body is that the seesaw hook is prevented from gliding and rising during transportation, which may prevent the attached load from becoming damaged or injured.

It should be understood that the relative proportions of the helicopter 330, user 324, seesaw hook 310, and rigging hardware 323A, 323B, may not be represented to complete accuracy. Additionally, alternative rigging hardware 323A, 323B may be used with the disclosed seesaw hook 310 in aerial search and rescue or in other examples of load lift and transportation. It should be understood that the user 324 may alternatively be attached to the seesaw hook 310 via the lifting hook 305 and the exemplary rigging hardware (323B) shown. It should also be understood that two users may be attached to the seesaw hook 310, such that a second user (not shown) is simultaneously attached to the lifting hook 305. It should also be understood that the placement of the bottom round ring 308B and the lifting hook 305 on the seesaw hook 310 may be switched, such that the bottom round ring 308B is attached onto the second side 317 and the lifting hook 305 is attached onto the first side 316 (as shown in FIG. 1).

Figure 4:
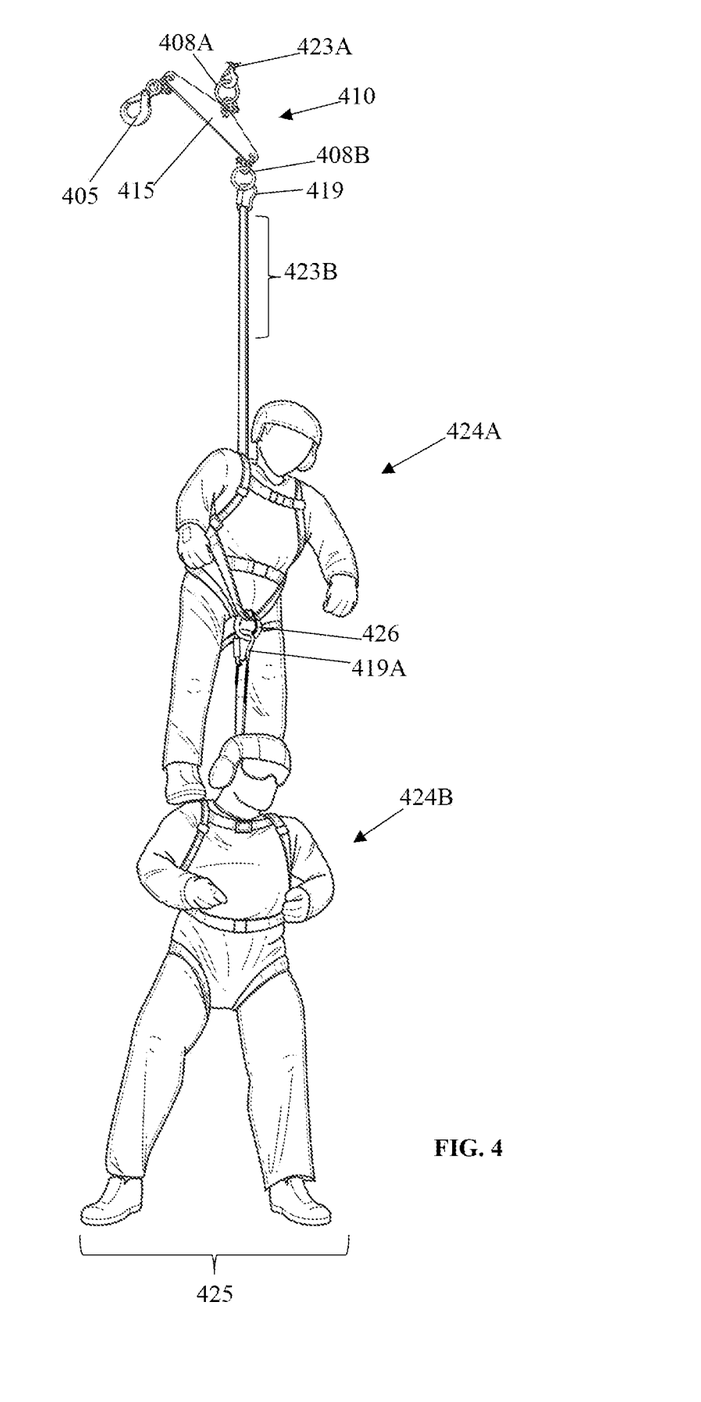
FIG. 4 illustrates a front perspective view of an exemplary use of the seesaw hook 110 shown in FIG. 1 in aerial rescue, according to an aspect.

FIG. 4 illustrates a front perspective view of an exemplary use of the seesaw hook 110 shown in FIG. 1 in aerial rescue, according to an aspect. As discussed previously above, the seesaw hook 410 may be used in aerial search and rescue for the rescuing of a stranded individual via helicopter, as an example. As mentioned above, the user may be attached to the seesaw hook 410 alternatively via the lifting ring 408B and exemplary rigging hardware 423B, as shown in FIG. 4. As such, the seesaw body 415 may then slightly tilt upwardly to the left, as shown, such that to balance the weight of the load (e.g., 325).

In continuation of the aerial search and rescue example described above and shown in FIG. 3, once the helicopter (e.g., 330) reaches the rescue sight, the helicopter may lower the first user 424A (shown previously by 324 in FIG. 3) down to a second user 424B. In the SAR example shown in FIG. 4, the second user 424B (or users) may be isolated in an environment densely populated by trees, for example, which will be described in greater detail when referring to FIG. 5 below. The first user 424A may attach the hoist 426 and supporting harness onto the second user 424B via a D-ring 419, for example, as shown, such that the second user 424B, i.e., the stranded individual, may be lifted and transported to safety. As mentioned previously above when referring to FIG. 3, utilization of the D-ring 419 may allow the first user 424A to easily and quickly attach the second user 424B onto the hoist and ring 426, as an example. Thus, the load 425 is now the combined weights of the first user 424A and the second user 424B, in which the second user 424B is connected below the first user 424A via the exemplary hoist 426, as mentioned above. As shown, the seesaw hook body 415 may be tilted downward in the direction of the load 425 during transportation. In this way, the seesaw body 415 is balancing the overall weight of the load 425, such that the two users may be stably transported and returned to safety, as an example. It should be noted that more than one additional user may be attached below the first user 424A, such that more than two users total are transported. Furthermore, it should be understood that equipment or other objects may also be attached below the second user 424B via the exemplary means (e.g., 426 and 419B) shown.

As shown in the example of FIG. 4, the lifting hook 405 may be unattached to any load(s), thus resulting in the seesaw body 415 tilting so drastically. As mentioned throughout this disclosure above, the lifting hook 405 may simultaneously be connected to another load, such as a second SAR user, for example, such that both sides (e.g., 316, 317 in FIG. 3) of the seesaw hook 410 are in use at one time. The seesaw body 415 in such a scenario will tilt, such that to distribute the overall load weight, accordingly, to ensure both loads attached to the bottom ring 408B and the lifting hook 405, respectively, are securely supported. As also mentioned above, the sides of the seesaw hook body 415 may comprise differing lengths, as shown, such that during the aerial transportation of the users 424A, 424B back to safety, the seesaw body 415 is prevented from lifting and gliding, which would potentially lead to a collision wherein the seesaw hook 410, the helicopter, and/or the users 424A, 424B are damaged, and/or injured or killed. As will be discussed in detail below, the seesaw body 415 may also be configured to allow the seesaw hook 410 to adapt to aerial surroundings in real time, such that to prevent any injury or damage to the loads being transported.

Figure 5:
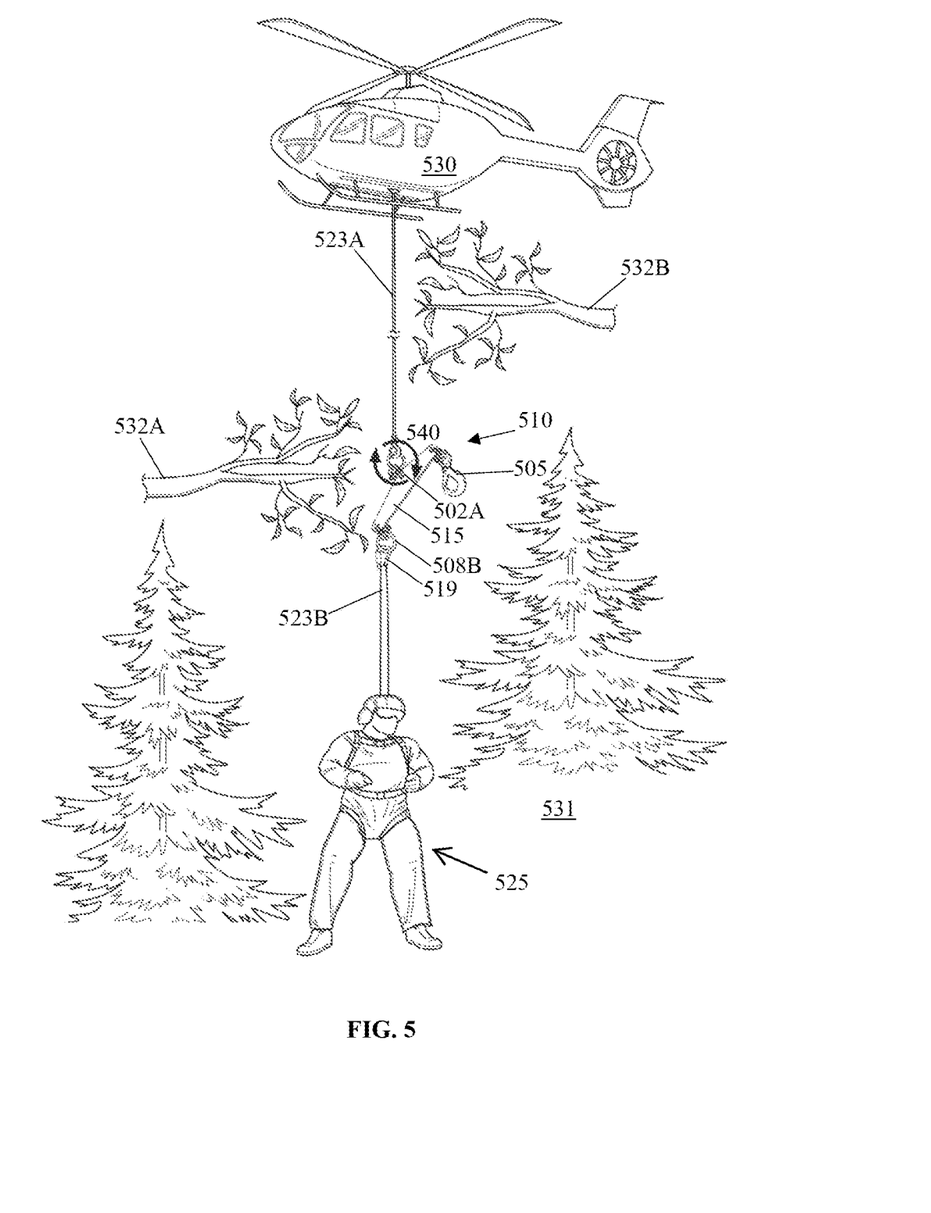
FIG. 5 illustrates a front perspective view of an exemplary situation in which a user attached to the seesaw hook 110 of FIG. 1 is caught between two tree branches, according to an aspect.

FIG. 5 illustrates a front perspective view of an exemplary situation in which a user 525 attached to the seesaw hook 110 of FIG. 1 is caught between two tree branches 532A, 532B, according to an aspect. As mentioned previously above, the seesaw hook 510 may be adapted for use by a helicopter 530 in SAR missions, which may involve the travel to areas and environments having narrow passages, such as a densely populated forest 531. In continuation of the SAR example discussed above and shown in FIGS. 3-4, let the stranded individual (e.g., 424B) be located in a densely populated forest 531, as shown in FIG. 5.

As an example, after the stranded individual, i.e., the second user (e.g. 424B), has been rescued and attached to the seesaw hook 510 (in the manner described above when referring to FIG. 4), the helicopter 530 may proceed to lift and transport the load 525 (i.e., the users) to safety, as described above. It should be understood that the second user (e.g., 424B in FIG. 4) has been omitted in this view for clarity. During the lift and/or the transportation of the load 525, the load 525 and/or the seesaw hook 510 may become caught or snagged between two trees in the forest 531, as shown as an example. As mentioned previously above, the seesaw hook 510 may be configured to adapt to these types of scenarios and situations. As an example, let the load/users 525 be caught between two trees, such that a first branch 532A extends directly in front of the seesaw hook 510, as shown, and a second branch 532B extends directly above the seesaw hook 510, as shown. In such a scenario, the helicopter 530 may not be able to traverse directly forward, since the seesaw hook 510 and exemplary rigging hardware 523A may snag onto the branch 532A, preventing the load 525 from getting clear from the forest 531. Thus, the helicopter's 330 only course of action in this scenario may be to traverse the seesaw hook 510 directly backwards, such that to get free of the first branch 532A, and then traverse directly upwards toward the second branch 532B.

As the helicopter 530 raises the seesaw hook 510 upwards, the seesaw hook 510 may contact and/or snag the second branch 532B, which would completely render a typical lifting hook stuck and/or immovable. However, because the seesaw hook body 515 comprises rounded corners (e.g., 103 in FIG. 1) and the lifting hook 505 is locked in place (as described when referring to FIG. 1), the seesaw hook 510 may more easily get free of the second branch 532B. Furthermore, as shown, because the exemplary rigging hardware 523A and the top lifting ring (e.g., 408A in FIG. 4) are attached to the seesaw body 515 via the top hole 502A, the seesaw body 515 may freely pivot to rotate, indicated by 540, about the top hole 502A. As such, as the helicopter 530 continues to raise the seesaw hook 510, the seesaw body 515 may be caused to pivot counterclockwise, as shown by 540, such that the seesaw body 515 may slide free of the second branch 532B. The seesaw hook 510 may thus clear the forest 531 and the load 525 may be transported to safety, as an example. Thus, an advantage is that the mobility of the seesaw body may allow the seesaw hook to get free in situations in which the seesaw hook has caught or snagged onto external objects during load lift and transportation.

It should be understood that the top and bottom rigging hardware 523A, 523B are shown in FIG. 5 as examples and are not meant to limit the various types of rigging hardware that may generally be used with the disclosed seesaw hook. Additionally, it should be understood that the disclosed seesaw hook may be used in tandem with other known SAR equipment, such as a hoist for a rescue litter, animal harnesses, quick links, etc. As mentioned throughout this disclosure above, it should be understood that the seesaw hook described herein may be adapted into a number of exemplary fields in addition to SAR, such as, for example, automotive assembly, construction, storage, cargo transportation, packaging, etc. It should be noted that, while the seesaw body is configured to preferably be triangular in shape, it may be possible to configure the seesaw body to be of other geometric shapes (e.g., a diamond shape) for balancing the load weight. Additionally, it should be understood that although the triangular seesaw body may be provided in an alternative embodiment, such as, for example, provided as three rods arranged in a triangular configuration and welded at the corners such that to form a single triangular body, the solid triangular plate is a superior design and is thus preferred. It should also be understood that the particular placement of the lifting hook(s) and the ring(s) on the plurality of holes in the seesaw body need not follow the placement shown in FIGS. 1 & 3-5.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

As used throughout this application, the term "load" refers to the object(s), individual(s), animal(s), etc. to be lifted and transported using the disclosed seesaw hook. It should be understood that any rigging hardware, including straps, containers, hooks, chains, harnesses, etc., are necessarily included as being a portion of the load in this application.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An apparatus for use by a load-lifting machine in aerial lift and transportation of at least one load, the apparatus comprising:

a triangular body having a first side, a second side, and a base, the triangular body being adapted to balance weights of two loads simultaneously aerially lifted and transported;

the first side having a first length and the second side having a second length, the first length being larger than the second length;

a plurality of holes, each hole of the plurality of holes being disposed in a corner of the triangular body;

a plurality of couplers, each coupler of the plurality of couplers being connected to one of the plurality of holes;

at least one lifting hook comprising a self-locking latch and an eye loop, the at least one lifting hook being connected to a first coupler of the plurality of couplers via the eye loop, and the at least one lifting hook being adapted to attach to the at least one load when the self-locking latch is released; and at least one ring connected to a second coupler of the plurality of couplers, the at least one ring being adapted to connect to the load-lifting machine;

the at least one lifting hook and the at least one ring being thus adapted such that when the at least one load is attached to the at least one lifting hook, and when the load-lifting machine causes a motion of the apparatus, the triangular body stabilizes the motion, and thus resulting in the aerial lift and transportation of the at least one load.

2. The apparatus of claim 1, wherein the load-lifting machine is a crane, a jack, or a helicopter.

3. The apparatus of claim 1, wherein the plurality of holes is three holes.

4. The apparatus of claim 1, wherein the at least one ring is two rings.

5. The apparatus of claim 4, wherein a second ring of the two rings is connected to a third coupler of the plurality of couplers, the second ring being adapted to attach to a second load.

6. The apparatus of claim 1, wherein the triangular body is constructed of steel.

7. The apparatus of claim 1, wherein the triangular body is horizontally oriented when the at least one ring is connected to the load-lifting machine.

8. An apparatus for use by a load-lifting machine in aerial lift and transportation of loads, the apparatus comprising:

a triangular solid body adapted to balance weights of the loads simultaneously aerially lifted and transported, the triangular solid body having a first side having a first length, a second side having a second length, and a base having a third length, the first length being larger than the second length, and the third length being larger than both the first length and the second length;

a plurality of holes, each hole of the plurality of holes being disposed in a corner of the triangular body; and a plurality of hooks, each hook of the plurality of hooks being connected to one of the plurality of holes, and each hook being adapted to attach to at least a portion of the loads;

wherein at least one hook of the plurality of hooks is also adapted to connect to the load-lifting machine;

the plurality of hooks being thus adapted such that when the loads are attached to the plurality of hooks, and when the load-lifting machine causes a motion of the apparatus, the triangular solid body balances the weights of the loads such that to stabilize the motion, and thus resulting in the aerial lift and transportation of the loads.

9. The apparatus of claim 8, wherein the load-lifting machine is a crane, a jack, or a helicopter.

10. The apparatus of claim 8, wherein each hook of the plurality of hooks comprises:

a coupler connected to one of the plurality of holes; and a lifting hook body having an eye loop and a self-locking latch, the eye loop being connected to the coupler and the self-locking latch being adapted to release;

the lifting hook body being adapted to attach to at least a portion of the loads when the self-locking latch is released.

11. The apparatus of claim 10, wherein the plurality of hooks is two hooks.

12. The apparatus of claim 8, wherein each hook of the plurality of hooks comprises:

a coupler connected to one of the plurality of holes; and a ring connected to the coupler, the ring being adapted to attach to at least a portion of the loads or to the load-lifting machine.

13. The apparatus of claim 12, wherein the plurality of hooks is two hooks.

14. The apparatus of claim 8, wherein the triangular body is horizontally oriented when the at least one hook is connected to the load-lifting machine.

15. An apparatus for use by a load-lifting machine in aerial lift and transportation of loads, the apparatus comprising:

a triangular solid body having a first side, a second side, and a base, the triangular solid body being adapted to balance weights of the loads simultaneously aerially lifted and transported;

the first side having a first length, the second side having a second length, and the base having a third length, the first length being larger than the second length, and the third length being larger than both the first length and the second length; and a plurality of holes, each hole of the plurality of holes being disposed in a corner of the triangular solid body;

wherein each hole of the plurality of holes is adapted to receive a hook configured for aerially lifting and transporting the loads.

16. The apparatus of claim 15, wherein the load-lifting machine is a crane, a jack, or a helicopter.

17. The apparatus of claim 15, wherein the hook comprises:

a coupler adapted to be connected to one of the plurality of holes; and a ring connected to the coupler, the ring being adapted to attach to at least a portion of the loads or to the load-lifting machine.

18. The apparatus of claim 15, wherein the hook comprises:

a coupler adapted to be connected to one of the plurality of holes; and a lifting hook body having an eye loop and a self-locking latch, the eye loop being connected to the coupler and the self-locking latch being adapted to release;

the lifting hook body being adapted to attach to at least a portion of the loads when the self-locking latch is released.

19. The apparatus of claim 15, wherein the triangular solid body is constructed of steel.

* * * * *